United States Patent Office 3,251,662
Patented May 17, 1966

3,251,662
PROPOXYLATED DERIVATIVES OF CYCLIC
AMIDINES IN HYDROCARBON OILS
Elizabeth L. Fareri, Pittsburgh, and Edward Mitchell,
Valencia, Pa., assignors to Gulf Research & Development Company, Pittsburgh, Pa., a corporation of Delaware
No Drawing. Filed Mar. 18, 1963, Ser. No. 266,010
19 Claims. (Cl. 44—63)

This invention relates to inhibiting growth of slime-promoting microorganisms in the presence of hydrocarbon distillate fuels. Microorganisms have been found to cause formation of deposits in the water bottoms of fuel oil storage tanks. The microorganisms tend to emulsify fuel and water, and form semi-solid residues or slimes which hold the microorganisms themselves, living and dead, and their by-products, rust particles and other mintue debris, in suspension. These slimes and residues, in turn, can plug filters and foul tank gauges, and otherwise interfere with the normal use of fuel. They can also contribute to corrosion by effectively holding water in contact with metal surfaces. The slimes are characterized by a relatively high chloride content, iron and sodium, in a water-soluble fraction, a very high iron content in a water-insoluble, solvent-insoluble fraction, and a relatively high carbon and hydrogen content (presumably derived from the fuel oil content of the slime) in a solvent-soluble fraction. Copper and mercaptan sulfur, if present at all, are found in the solvent-soluble fraction only and then only in negligible proportions.

A wide variety of microorganisms, including aerobic and anaerobic bacteria, actinomycetes and fungi of types known to inhabit soil, fresh water and salt water—some of whose spores are even airborne—have been found to subsist in fuel tank botoms. These microorganisms appear to require water for life and to thrive at the water-oil interface, but under proper conditions can extend well into the fuel phase.

It has been proposed to alleviate microbial fuel contamination by the use of biocidal materials. However, this solution has not been entirely satisfactory since many common biocidal materials are ineffective in practical concentrations against the kinds of microorganisms present in fuel tank bottoms, and many others have been found unsuitable because of adverse effects on the metals forming the fuel system and engine parts, e.g., rust and corrosion, or upon the fuel quality, e.g., sulfur content, gum-forming tendencies, water separability, acid number, particulate matter content, and the like.

The present invention relates to inhibiting growth of microorganisms in distillate hydrocarbon fuels, whereby problems of malfunctioning of fuel systems utilizing such fuels is markedly reduced or alleviated. We have found that growth of microorganisms in fuel-containing systems can be inhibited by incorporating in the fuel, or in a water phase in contact with such fuel, a small amount of a propoxylated derivative of a cyclic amidine having the general formula:

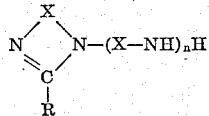

where R is an aliphatic hydrocarbon radical containing 7 to 21 and preferably 11 to 17 carbon atoms, such as hendecyl, tridecyl, pentadecyl, heptadecyl (margaryl), heptadecenyl and heptadecadienyl, X is an ethylene or trimethylene group, and $n$ is 1 to 3, where said propoxylated derivative contains 1 to 7 and preferably 2 to 5 oxypropylene groups per molecule. The present invention includes fuel oils so inhibited either in or out of contact with a contaminated water phase, as well as the process of treating contaminated, binary fuel-water systems. The aliphatic hydrocarbon substituent attached to the cyclic amidine nucleus can be straight or branched chain and saturated or unsaturated. Examples of such substituents include alkyl radicals such as n-heptyl, n-hendecyl, tridecyl, pentadecyl and heptadecyl. Examples of other suitable aliphatic hydrocarbon substituents are alkenyl radicals such as hendecenyl, tridecenyl, heptadecenyl, and alkadienyl radicals such as heptadecadienyl and alkatrienyl radicals such as heptadecatrienyl. The propoxylated derivative of 1 - (2-aminoethyl)-2-heptadecenylimidazoline containing an average of about two oxypropylene groups per molecule is an example of a preferred material for the purposes of this invention. Examples of other such material are the 2:1, 3:1 and 5:1 mol ratio propylene oxide adducts of 1-(2-aminoethyl)-2-heptylimidazoline, 1-(2-aminoethyl)-2-hendecylimidazoline, 1-(2-aminoethyl)-2 - heptadecylimidazoline, 1-(2-aminoethyl)-2-heptadecadienylimidazoline, 1-(3-aminopropyl)-2-heptadecenyltetrahydropyrimidine, 1-(3-aminopropyl)-2-heptadecytetrahydropyrimidine, 1–7 - amino - 4 - azaheptyl)-2 - heptadecenyltetrahydropyrimidine and 1-(7-amino-4-azaheptyl)-2-heptadecyltetrahydropyrimidine.

The microbicidal materials referred to can be introduced into the contaminated fuel-water system either as such by direct addition to individual fuel storage systems, or in the form of a solution or suspension in the fresh fuel supplied to the storage facilities, or in other ways.

The microbicidal agents useful for the purposes of the present invention can be prepared in any convenient way. For example, they can be prepared by the reaction of propylene oxide with an appropriate, substituted imidazoline or tetrahydropyrimidine. This addition reaction takes place spontaneously to an appreciable degree at ambient atmospheric conditions, but in order to achieve a more practical reaction rate it is normally preferred to carry out the reaction at temperatures in the range of about 100° to 175° C., preferably about 150° C., under reflux conditions. Alkaline catalysts such as potassium carbonate, sodium hydroxide or quaternary ammonium hydroxides can be used to accelerate the reaction, but they are not absolutely essential. The cyclic amidine starting materials have been previously described in the literature and a number of these materials can be obtained commercially. Cyclic amidines that are not obtainable commercially can be readily synthesized in known manner by condensation of a higher fatty acid with a polyamine.

When the biocidal materials are added to individual fuel storage systems or tanks containing contaminated water, some biocidal effect will be noted at concentrations of as little as 1 percent, based on the weight of the water bottoms of the tank, but we prefer to employ the disclosed materials in amounts of at least 2 percent based on the weight of the water bottoms. For tank treating purposes, it has been found that the volume of water bottoms in a system that is essentially uncontrolled will ordinarily be about one-half of 1 percent of the tank volume, although in extreme cases the water bottoms may run as much as about 2.5 percent or more of the tank volume. Thus, in a conventional domestic installation, a 275 gallon storage tank may be found to contain about 0 to 5 gallons of water bottoms.

When the antimicrobial agents described herein are added to the fuel before storage in a contaminated or potentially contaminable system, it is desirable to employ such agents in the fuel in proportions equivalent to at least about 1 percent and preferably at least 2 percent of the addition agent based on the weight of the water bottoms that will be contacted with the treated fuel. Thus, there will normally be added to the fuel at least 0.005 percent, and preferably at least 0.01 percent by weight of the fuel of the antimicrobial agent.

The herein-disclosed antimicrobial agents can be added in any effective amounts greater than those described above, up to the limit of solubility in the fuel and in the water bottoms, that will not adversely affect the combustion characteristics, corrosiveness, gum-forming tendencies, water separability, acid number, sediment content, and other factors affecting the quality of the fuel. As a practical matter, no additional advantages normally will be obtained from the standpoint of biocidal activity by the use of amounts in excess of about 6 percent by weight of the water bottoms or 0.05 percent by weight of the fuel, but greater amounts can be used.

In basing the proportions of antimicrobial agents upon the weight of the fuel or the weight of the water bottoms, we do not mean to imply that the amount indicated necessarily remains entirely in the oil or in the aqueous phase. The antimicrobial agents of this invention are appreciably soluble in both the oil and water phases and therefore will be expected to partition themselves between both phases of a fuel-water binary system.

The biocidal agents disclosed herein can be incorporated in the fuel oils before or after contact with a source of microbial contamination, and they can be employed either as such or in admixture with compatible diluents, solvents or blending agents that do not materially impair the biocidal action of the agents.

As illustrative of the preparation of the propoxylated derivatives described herein, a propylene oxide adduct of 1-(2-aminoethyl)-2-heptadecenylimidazoline having a 2:1 mol ratio of propylene oxide to the imidazoline is prepared by adding liquid propylene oxide dropwise to a flask provided with a reflux condenser and containing 30.0 grams (0.071 mol) of 1-(2-aminoethyl)-2-heptadecenylimidazoline (Nalcamine G–39M), over a temperature range of 100° to 136° C., until a weight increase of 8.2 grams has occurred. The 8.2 grams weight increase of propylene oxide represents 0.142 mol and corresponds to a mol ratio with respect to the Nalcamine G–39M such that the propylene oxide adduct contains two oxypropylene groups per molecule of adduct.

The effectiveness of the herein-disclosed biocidal propylene oxide adducts was demonstrated by adding 0.06 gram of a 2:1 mol ratio propylene oxide adduct of 1-(2-aminoethyl)-2-heptadecenylimidazoline to a 300 ml. sample of a furnace oil falling within the specifications of a No. 2 fuel oil, and adding the treated oil sample to a flask containing 50 ml. of sterile mycophil broth. This mixture in turn was inoculated with a mixed culture of microorganisms taken from aqueous tank bottoms from furnace oil tanks. The flask was stoppered with a cotton plug and stored at room temperature in the dark. The sample was examined once each week for 60 days and the amount of microbial growth rated according to the following scale: 0=none, ±=questionable, +=slight, 2+=fair, 3+=good, 4+=excellent. The test is terminated at 4+ growth rating or 60 days. At the conclusion of the above-described test, no microbial growth (0 rating) was observed. In contrast, an uninhibited sample of the fuel oil permitted 4+ growth in 11 days.

In a practical embodiment 75.7 grams of a 2:1 mol ratio propylene oxide adduct of 1-(2-aminoethyl)-2-heptadecenylimidazoline is added to the fill line of a 275 gallon tank of furnace oil answering to the specification of a No. 2 fuel oil and containing approximately 1 gallon of water bottoms contaminated with deposit-promoting microorganisms, and the two liquids are maintained in contact—with normal fuel withdrawal—for a period of time sufficient to inhibit growth of the microorganisms. After 11 days at ambient conditions, a period normally sufficient to permit vigorous microbial growth, no growth is observed.

In still another embodiment, a propylene oxide adduct of 1-(2-aminoethyl)-2-heptadecenylimidazoline containing an average of two oxypropylene groups per molecule, in the form of a concentrated solution in fuel oil, is metered into a refinery stream of a No. 2 fuel oil in a proportion sufficient to produce a concentration of 0.05 percent of the adduct by weight of the fuel oil. The oil is then directed into the tank containing contaminated water bottoms. Thereafter, microbial growth in the water bottoms is terminated and maintained indefinitely at a low level by intermittent introduction of fresh fuel oil into the tank to replace normal withdrawals.

In still other embodiments, a propylene oxide adduct of 1-(3-aminopropyl)-2-heptadecenyltetrahydropyrimidine containing an average of two oxypropylene groups per molecule is substituted on a weight by weight basis for the adduct of the preceding embodiments.

The biocidal agents of the subject invention have also been found to possess stabilizing properties in fuel oils, that is to say, the microbicidal agents described herein, in addition to inhibiting microbial growth in contaminated fuel systems, have also been found to inhibit the deposition of sludge resulting from the degradation of unstable components of the fuel oil during storage. The effectiveness of the propylene oxide adducts disclosed herein as fuel oil sludge inhibitors has been demonstrated by means of a standard accelerated sludging test which was carried out by heating a 600 grams sample of a normally unstable No. 2 fuel oil for 64 hours at 210° F., in a loosely stoppered, one-quart, clear glass bottle. After the heating period, the test sample is cooled to room temperature and filtered by suction through tared, medium porosity, fritted glass, Gooch-type crucibles. The sludge in the crucible is washed with heptane, and complete removal of the sludge adhering to the inside of the bottle is obtained by means of a rubber policeman and heptane. The crucible is then dried in an oven maintained at 210° F. for one hour, cooled in a desiccator and reweighed. The increase in weight is recorded as milligrams of sludge per 600 grams of oil. The effectiveness of the inhibitor can be judged by the comparison of the sludge produced in inhibited and uninhibited samples of the fuel oil.

The results of the foregoing test were as indicated in the following table:

| Make-Up, Percent By Wt. | Insolubles, mg./600 g. Fuel | ASTM D-1500 Color |
|---|---|---|
| No. 2 Fuel Oil, 50/50 by Vol. Blend Straight Run and Fluid Catalytically Cracked No. 2 Fuel Oil Distillate | 90.7 | 5.5 |
| +0.02 Wt. Percent of 2:1 Mol Ratio Adduct of Propylene Oxide and 1-(2-aminoethyl)-2-heptadecenylimidazoline | 7.6 | 2.0 |

From the foregoing results it will be seen that propylene oxide adducts of the class disclosed herein markedly improve the stability of the base oil.

The exact mechanism of functioning of the herein-disclosed propylene oxide adducts is not fully understood. However, it has been ascertained that the presence of the oxypropylene radicals in the ultimate adducts is very important, as the propylene oxide adducts have been found markedly superior both with respect to the parent cyclic amidines as such and to the corresponding ethylene oxide adducts from the standpoint of fuel stabilizing properties and other properties.

The invention is not limited to the propoxylated adducts of the cyclic amidines described in the preceding specific embodiments, as good results will also be obtained by the use of other biocidal materials of the class indicated herein, in the same or equivalent proportions. For example, there can be used the 2:1, 3:1 and 5:1 mol ratio propylene oxide adducts of 1-(2-aminoethyl) - 2 - heptadecenylimidazoline, 1-(2-aminoethyl)-2 - heptylimidazoline, 1-(2-aminoethyl)-2-hendecylimidazoline, 1-(2-aminoethyl)-2-heptadecylimidazoline and 1-(2-aminoethyl) - 2-heptadecadienylimidazoline.

If desired, the herein-disclosed biocidal materials can be used in the fuel oils or fuel oil storage systems in admixture with other water and/or oil-soluble agents, such as anti-icing agents, corrosion inhibitors, sequestering agents, oxidation inhibitors, anti-foam agents, combustion improvers, and/or other agents adapted to improve one or more properties of the oil.

No. 2 fuel oils are defined in ASTM Tentative Specification D-396-61T.

In view of the broad spectrum of biocidal activity shown by the herein disclosed agents, it is contemplated that these agents will also be effective to destroy microorganism growth in other hydrocarbon oil-water systems. For example, the agents disclosed herein can be employed in biocidal amounts in the oil-water systems involved in cutting oil compositions, fire-resistant hydraulic fluids, and jet propulsion fuel storage systems, to prevent growth of microorganisms therein.

Obviously, numerous modifications of the invention described hereinabove can be resorted to without departing from the spirit or scope thereof. Accordingly, only such limitations should be imposed on the invention as are indicated in the appended claims.

We claim:

1. The method of inhibiting microbial growth in a hydrocarbon fuel system and stabilizing said fuel, comprising incorporating in such fuel system containing a liquid hydrocarbon fuel in contact with an aqueous phase, a small amount, effective to inhibit microbial growth, of a propoxylated derivative of a cyclic amidine having the general formula:

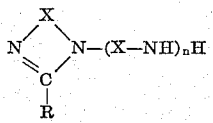

where R is an aliphatic hydrocarbon radical containing 7 to 21 carbon atoms, X is a member selected from the group consisting of ethylene and trimethylene radicals, and $n$ is 1 to 3, where said propoxylated derivative contains an average of about 1 to 7 oxypropylene groups per molecule, at least one of said fuel and said aqueous phase that is contaminated with the microorganisms.

2. The method of claim 1, where said small amount is in the range of about 2 to 6 percent by weight of the aqueous phase.

3. The method of claim 1, where R is a member selected from the group consisting of alkyl, alkenyl, alkadienyl and alkatrienyl radicals containing 11 to 17 carbon atoms, X is the ethylene radical, and $n$ is 1.

4. The method of claim 1, where said cyclic amidine is 1-(2-aminoethyl)-2-heptadecenylimidazoline and said derivative contains an average of about 2 oxypropylene groups per molecule.

5. The method of claim 1, where the fuel is a No. 2 fuel oil.

6. The method of inhibiting microbial growth in fuel oil systems and stabilizing said fuel, comprising incorporating in a liquid hydrocarbon fuel, a small amount, effective to inhibit microbial growth of a member selected from a propoxylated derivative of a cyclic amidine having the general formula:

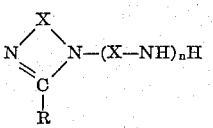

where R is an aliphatic hydrocarbon radical containing 7 to 21 carbon atoms, X is a member selected from the group consisting of ethylene and trimethylene radicals, and $n$ is 1 to 3, where said propoxylated derivative contains an average of about 1 to 7 oxypropylene groups per molecule, and contacting said fuel oil with an aqueous phase that is contaminated with the microorganisms.

7. The method of claim 6, where said small amount is in the range of about 0.01 to 0.05 percent by weight of the fuel.

8. The method of claim 6, where R is a radical selected from the group consisting of alkyl, alkenyl, alkadienyl and alkatrienyl radicals containing 7 to 17 carbon atoms, X is the ethylene radical, and $n$ is 1.

9. The method of claim 6, where said cyclic amidine is 1-(2-aminoethyl)-2-heptadecenylimidazoline and said derivative contains an average of about 2 oxypropylene groups per molecule.

10. The method of claim 6, where the fuel is a No. 2 fuel oil.

11. A hydrocarbon oil composition, comprising a major amount of a hydrocarbon oil and a small amount, effective to inhibit microbial growth and stabilize said oil, of a propoxylated derivatives of a cyclic amidine having the general formula:

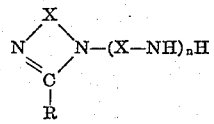

where R is an alphatic hydrocarbon radical containing 7 to 21 carbon atoms, X is a member selected from the group consisting of ethylene and trimethylene radicals, and $n$ is 1 to 3, where said propoxylated derivative contains an average of about 1 to 7 oxypropylene groups per molecule.

12. A fuel composition, comprising a major amount of a liquid hydrocarbon fuel to which has been added about 0.01 to 0.05 percent by weight of a propoxylated derivative of a cyclic amidine having the general formula:

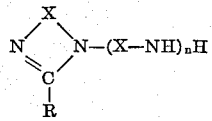

where R is an aliphatic hydrocarbon radical containing 7 to 21 carbon atoms, X is a member selected from the group consisting of ethylene and trimethylene radicals, and $n$ is 1 to 3, where said propoxylated derivative contains an average of about 1 to 7 oxypropylene groups per molecule, said propoxylated cyclic amidine adapted for microbicidal and fuel stabilization activity.

13. The fuel composition of claim 13, where the fuel is a No. 2 fuel oil.

14. The fuel composition of claim 12, where R is a member selected from the group consisting of alkyl, alkenyl, alkadienyl and alkatrienyl radicals containing 11 to 17 carbon atoms, X is the ethylene radical, and $n$ is 1.

15. The fuel composition of claim 12, where said cyclic amidine is 1-(2-aminoethyl)-2-heptadecenylimidazoline and said derivative contains an average of about 2 oxypropylene groups per molecule.

16. A binary liquid system comprising a predominant proportion of a liquid hydrocarbon fuel in contact with a relatively small amount of an aqueous phase, at least one of said fuel and said aqueous phase being contaminated with microorganisms, said system containing about 2 to 6 percent by weight of the aqueous phase of a propoxylated derivative of a cyclic amidine having the general formula:

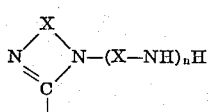

where R is an aliphatic hydrocarbon radical containing 7 to 21 carbon atoms, X is a member selected from the group consisting of ethylene and trimethylene radicals, and $n$ is 1 to 3, where said propoxylated derivative contains an average of about 1 to 7 oxypropylene groups per molecule, said propoxylated cyclic amidine being soluble in both said fuel and said aqueous phase whereby it is partitioned between said fuel and said aqueous phase, said propoxylated cyclic amidine being adapted for microbicidal and fuel stabilization activity in said system.

17. The binary liquid system of claim 16, where the fuel is a No. 2 fuel oil.

18. The binary liquid system of claim 16, where R is a member selected from the group consisting of alkyl, alkenyl, alkadienyl and alkatrienyl radicals containing 11 to 17 carbon atoms, X is the ethylene radical, and $n$ is 1.

19. The binary liquid system of claim 16, where said cyclic amidine is 1-(2-aminoethyl)-2-heptadecenylimidazoline and said derivative contains an average of about 2 oxypropylene groups per molecule.

References Cited by the Examiner
UNITED STATES PATENTS

| | | | |
|---|---|---|---|
| 2,713,582 | 7/1955 | Smith | 167—33 X |
| 2,713,583 | 7/1955 | Smith | 167—33 X |
| 2,819,284 | 1/1958 | Shen | 44—63 X |
| 2,975,042 | 3/1961 | Summers | 44—78 X |
| 2,975,043 | 3/1961 | Ambrose | 44—78 X |

DANIEL E. WYMAN, *Primary Examiner.*

C. O. THOMAS, *Examiner.*

Y. M. HARRIS, *Assistant Examiner.*

UNITED STATES PATENT OFFICE
CERTIFICATE OF CORRECTION

Patent No. 3,251,662                            May 17, 1966

Elizabeth L. Fareri et al.

It is hereby certified that error appears in the above numbered patent requiring correction and that the said Letters Patent should read as corrected below.

Column 6, line 50, for the claim reference numeral "13" read -- 12 --.

Signed and sealed this 1st day of August 1967.

(SEAL)
Attest:

EDWARD M. FLETCHER, JR.
Attesting Officer

EDWARD J. BRENNER
Commissioner of Patents